United States Patent [19]

Getz

[11] Patent Number: 5,248,568
[45] Date of Patent: Sep. 28, 1993

[54] BLOWOUT MULTILAYER FILM SEAL ASSEMBLY FOR GALVANIC CELLS

[75] Inventor: Dale R. Getz, North Ridgeville, Ohio

[73] Assignee: Eveready Battery Company, Inc., St. Louis, Mo.

[21] Appl. No.: 886,115

[22] Filed: May 20, 1992

Related U.S. Application Data

[63] Continuation of Ser. No. 784,360, Oct. 29, 1991, abandoned.

[51] Int. Cl.$^5$ .............................................. H01M 2/12
[52] U.S. Cl. ...................................... 429/56; 429/174
[58] Field of Search ............... 429/56, 53, 171, 172, 429/174, 185; 220/207, 265, 89.2, DIG. 27

[56] References Cited

U.S. PATENT DOCUMENTS

| | | | |
|---|---|---|---|
| 2,922,833 | 1/1960 | Philipp | 136/177 |
| 3,920,475 | 11/1975 | Nabiullin et al. | 136/86 A |
| 4,581,304 | 4/1986 | Beatty et al. | 429/56 |
| 4,774,155 | 9/1988 | Nientiedt et al. | 429/56 |
| 5,051,323 | 9/1991 | Murphy et al. | 429/165 |
| 5,079,106 | 1/1992 | Urry | 429/27 |

OTHER PUBLICATIONS

CEGASA International—"Engineering Manual-GEGASA Air-Alkaline Batteries with Self-Recharging Feature", J.C.L. Zigor Corporation, pp. 1–18, Copyright 1984, "The CEGasa Air-Alkaline Battery".

*Primary Examiner*—Anthony Skapars
*Attorney, Agent, or Firm*—Robert W. Welsh

[57] ABSTRACT

A multilayer film seal for use in galvanic cells, such as alkaline cells, comprising an organic polymeric seal member, such as polypropylene, having a base with at least one opening and a multilayer plastic film, such as polypropylene, disposed onto and secured to the base and wherein the pressure required to burst the multilayer plastic film is no grater than 120% of the pressure required to burst a single layer of the same material as, and having one half the thickness of, the multilayer plastic film.

20 Claims, 2 Drawing Sheets

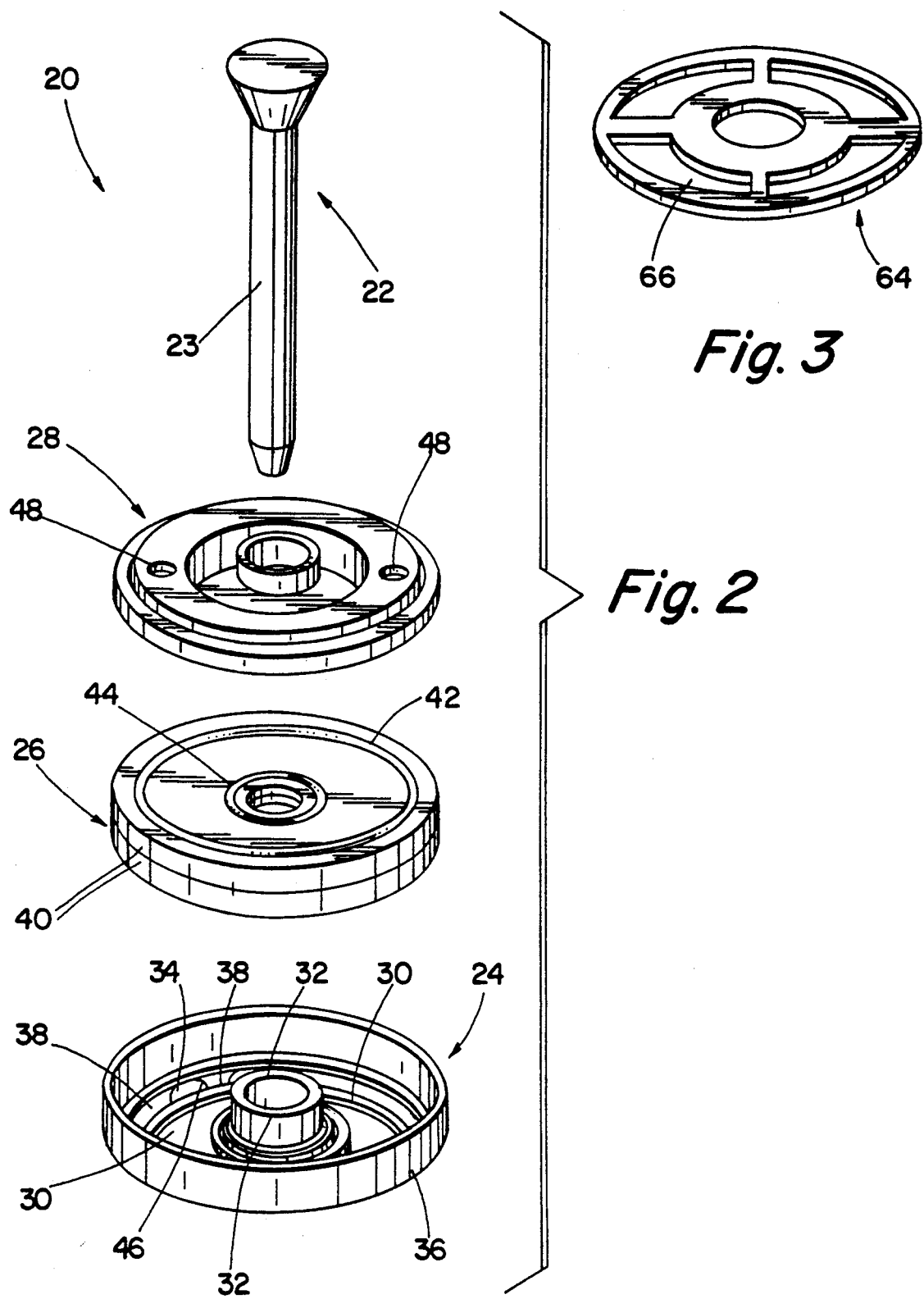

BLOWOUT MULTILAYER FILM SEAL ASSEMBLY FOR GALVANIC CELLS

This is a continuation of copending application Ser. No. 07/784,360, filed on Oct. 29, 1991, now abandoned.

FIELD OF THE INVENTION

The invention relates to a multilayer film seal for use in a galvanic cell comprising an organic polymeric seal member having a base with at least one opening and a multilayer plastic film disposed onto and secured to the base in which said multilayer plastic film comprising at least two layers of a first plastic film, such as polytetrafluoroethylene, and wherein the pressure required to burst the multilayer plastic film is no greater than 120% of the pressure required to burst a single layer of the same plastic material having one half the thickness of the multilayer.

BACKGROUND OF THE INVENTION

Alkaline cells are well known in the art and generally employ a zinc anode, manganese dioxide as the cathode with an aqueous solution of potassium hydroxide for the electrolyte. These cells are readily available commercially for industrial and home applications. Recently a new type of alkaline cell was disclosed by Cegasa International, a Spanish company. This cell, referred to as an air-assisted cell, employs zinc as the anode and manganese dioxide as the cathode with an aqueous solution of potassium hydroxide as the electrolyte. This cell is designed so that the positive electrode containing the manganese dioxide ($MnO_2$) is supported about its periphery and along its full length in the cell by a perforated ribbed air distribution grid. The bottom or negative end of the cell has an insulating support which allows air to enter the cell and pass up along the outside of the supported positive electrode. When the cell is initially put into a circuit, the electrochemical reaction depends primarily upon the presence of the manganese dioxide cathode. As the reaction progresses, and the manganese dioxide cathode is electrochemically reduced, air within the cell reoxidizes and recharges the manganese dioxide. Thus an air-assisted cell is designed to use oxygen in the air to "recharge" manganese dioxide in the cathode. This "recharging" of the manganese dioxide means that the fixed quantity of manganese dioxide in the cathode can be discharged and then recharged numerous times. In contrast, the cathode's ampere hour output in a standard alkaline battery is limited by the quantity of manganese dioxide incorporated in the cell when the cell is manufactured. Therefore, based upon the cathode's ampere hour input, the maximum service obtainable from an air-assisted alkaline battery is greater than the maximum service which can be obtained from a comparably sized standard alkaline battery. The need to get oxygen to the manganese dioxide in an air-assisted alkaline cell means that a portion of the battery, such as the seal, must be designed to allow oxygen to flow through and directly contact the cathode. Contrary to this, the seal in regular alkaline cells is designed to be air tight.

Different types of seals have been used which permit air to pass through the seals while preventing the ingress and/or egress of undesirable materials into and from the cell, respectively. Specifically, the seal must prevent electrolyte from the cell from passing through the seal. Another desirable feature of the seal is to provide a safety vent which will rupture and release the cell's internal pressure when the internal pressure exceeds a predetermined value. Although a seal can be designed to permit air to enter the cell and prevent electrolyte from escaping from the cell, it is difficult to have the seal with these characteristics also function as a safety vent.

Other galvanic cells, such as alkaline cells, are generally designed to vent when the internal pressure exceeds a predetermined amount. When exposed to an abuse condition, such as being charged to an excessive degree, the cell is designed to vent and allow gas to escape. Under certain abuse conditions, electrolyte entrained in the gas may be forced from the cell. It is preferable to have the electrolyte escape rather than have the cell rupture from internal pressure buildup.

Cell manufacturers have used a number of approaches to resolve the problem of expelling electrolyte during venting. One method of preventing seal rupture due to abuse charging or the like is to insert a diode in the battery's electrical circuit. By eliminating the possibility of charging the cells, internal gas is not generated and the seal never ruptures. Another electrically related mechanism is a belleville shaped "flip switch". This device is triggered by bulging of the closed end of the cell's cylindrical container which causes the belleville member to invert and thereby break electrical contact. Another method involves the use of adsorbents or electrolyte thickeners. The adsorbent materials are usually located outside the seal area and beneath the cell's cover or jacket. As electrolyte escapes from a ruptured seal, the liquid is adsorbed. Spew thickeners are mixed with the electrolyte and therefore are contained within the cell. The objective of the thickener is to slow down and/or adsorb any leakage that may occur. The disadvantage of using either an adsorbent or a thickener is that both materials tie up space that otherwise could be used for active materials of the cell. A third procedure is to use an outer container and end covers as an electrolyte containment system to provide space to contain the electrolyte that may escape.

It is an object of the present invention to provide a seal for galvanic cells that will burst when the internal pressure exceeds a predetermined level.

It is another object of the present invention to provide a multilayer film for a seal assembly for galvanic cells that will burst or blowout when the internal pressure exceeds a predetermined level and wherein the pressure required to blowout the multilayer film is no greater than 20% higher than the pressure to blowout a single layer of the same material having one half the thickness of the multilayer film.

It is another object of the present invention to provide a seal and safety vent assembly for galvanic cells, such as air-assisted cells and alkaline cells, that is easy to make and cost effective to produce.

The above and further objects will become apparent upon consideration of the following description and drawings thereof.

SUMMARY OF THE INVENTION

The invention relates to a galvanic cell comprising the active components of the cell, including an electrolyte, all housed within a container closed by a cover associated with a seal assembly comprising an organic polymeric seal member having a base with at least one opening and a multilayer plastic film disposed onto and secured to said base, said multilayer plastic film comprising at least two layers of a plastic film and said cover and seal assembly defining a space above said multilayer plastic film and wherein the internal pressure within the cell required to expand and burst the multilayer plastic film into the defined space is no greater than 20% higher than the pressure to expand and burst a single layer of the same material as and having one half the thickness, of the multilayer plastic film. Preferably, the pressure should be no greater than 15% higher and more preferably no greater than 10% higher than the pressure to expand and burst a single layer of the same material having one half the thickness of he multilayer plastic film. Thus upon reaching a predetermined internal pressure, the multilayer plastic film will expand into the defined space between the cover and the seal assembly until it bursts thus providing a space to relieve the pressure and prevent premature rupture of the cell. In some cell systems the electrolyte along with gases could be discharged through the opening in the burst multilayer plastic film into the defined space.

When welding a single layer plastic film having the required blowout characteristics onto the base of a seal member, the film may be too thin for good heat welding techniques. Thus a good bonding of the single layer film to the base of the seal member may not be obtainable. By using two or more layers of plastic film it has been found that the pressure to burst the multilayer film is no more than 20% higher than a single layer of one half the thickness of the multilayer plastic film. With this discovery, the multilayer plastic film may be double the thickness as the single layer film while providing more material to effect a good heat welding bond to the seal member without increasing the blowout pressure by more than 20%. In addition, since thin plastic films are subject to pin holes that could allow electrolyte to escape, a multilayer film will correct for this deficiency. The probability of superimposed layers of plastic film having pin holes leakage is extremely rare.

The thickness of the multilayer film will depend upon the pressure required to burst the film. If a neutral cover is used, then the vent pressure is also determined by controlling the diameter of the vent hole in the neutral cover. For example, in D-size, C-size or AA-size cells the thickness of each layer in the multilayer film could be from 2 to 6 mils thick, preferably from 4 to 5 mils thick. The thickness of each layer in the multilayer film does not need to be the same and can vary depending on the cell system and pressure at which the seal is designed to vent. For example, in a two layer film the first layer could be 4 mils thick and the second layer could be 6 mils thick. For most applications, D-size cells could be designed to vent when the pressure buildup within the cell is from 400 to 500 psi while in AA-size cells the pressure buildup to vent the cells could be from 800 to 1200 psi.

The seal assembly of this invention is suitable for all types of cell systems such as primary alkaline cells, air depolarizer cells, air-assisted alkaline cells, rechargeable alkaline cells metal hydride cells and lead acid cells. In describing the invention, an air-assisted alkaline cell will be described. For an air-assisted alkaline cell, the multilayer film must be sufficiently thick to prevent undesirable materials, such as the electrolyte, from exiting the container yet not too thick to prevent the film from rupturing when the internal pressure exceeds a predetermined amount. The multilayer film must prevent escape of electrolyte while simultaneously permitting air to pass into the cell. The preferred film material for the multilayer film is polypropylene, polytetrafluoroethylene, polyethylene and nylon.

A preferred embodiment of the seal assembly for air-assisted alkaline cells would comprise an organic polymeric seal member having a base, a central opening defined by a centrally upstanding wall, a peripheral upstanding skirt and having at least one opening in the base to permit air to flow into the cell. The multilayer plastic film could be designed with an opening at its center to accommodate the centrally upstanding wall so that it could be disposed onto the base member between the centrally upstanding wall and the peripheral skirt. The multilayer film area near the peripheral upstanding skirt and the multilayer film area near the centrally upstanding wall could be heat bonded using conventional techniques such as ultrasonic welding. By bonding these areas, a secured multilayer film seal member is formed. Preferably, the multilayer film can be disposed onto the base of the seal member and then the multilayer film can be secured together and to the base using ultrasonic welding. A neutral cover having at least one opening could be placed over and onto the multilayer film thereby maintaining the defined space between the external cover and the multilayer film. The neutral cover could be designed with a space over at least a portion of the multilayer film so that the multilayer film can initially expand into said space and then into and through the opening in the neutral cover where it can then burst in the space below the external cover. The external cover for air-assisted alkaline cells will have at least one opening and after being placed over the neutral cover and seal assembly, the cover is secured to the container of the cell through the use of the peripheral skirt of the seal member.

If desired, a top plastic film or washer could be disposed on the multilayer film and be composed of a spoked wheel configuration, or a configuration with spaced apart openings to permit the multilayer film to balloon upward through the opening without undue restriction. Another embodiment would entail the use of an inner top ring of film material that could be bonded to the area near the centrally upstanding wall along with a separate outer top ring of film that could be bonded to the area near the peripheral upstanding skirt thereby firmly securing the multilayer film to the base of the seal member. If also desired, a plastic film or washer as shown in FIG. 3, could be disposed on the interior side of the multilayer film provided it permits air to pass through and has at least one opening to expose the multilayer film to the interior of the cell.

BRIEF DESCRIPTION OF THE DRAWINGS

FIG. 2 is an exploded view of the subassembly used in assembling the cell of FIG. 1.

FIG. 3 is a perspective view of a top film or washer having a plurality of openings and designed to fit over the multilayer film.

DETAILED DESCRIPTION OF THE PREFERRED EMBODIMENTS

Figure 1:
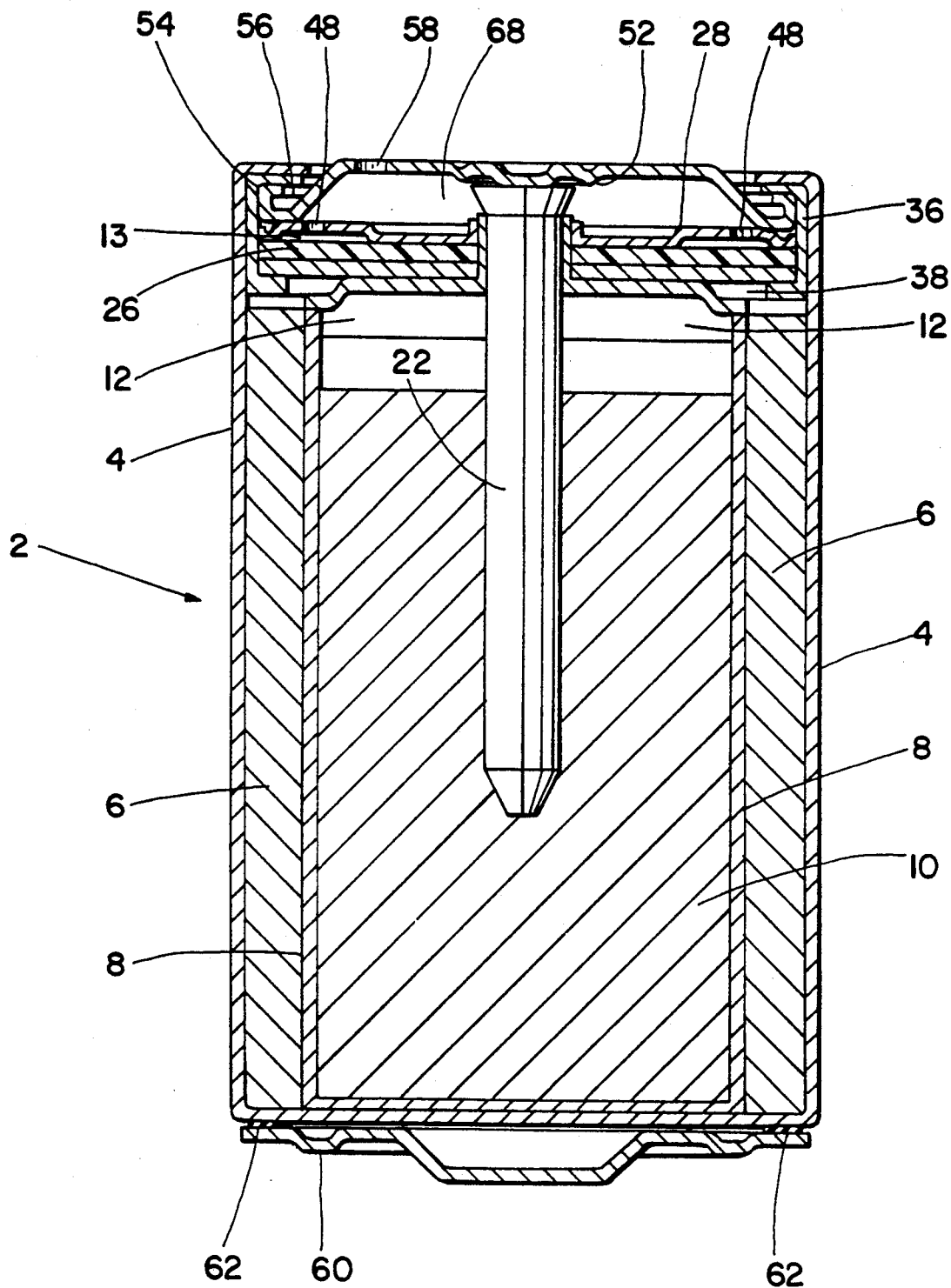
FIG. 1 is a cross sectional view of an inverted air-assisted alkaline cell of the present invention.

Referring to FIG. 1, the air-assisted alkaline cell 2 is assembled in a conventional conductive steel container 4 which also forms an external terminal for the cell. The cathode 6 for the cell 2 is porous manganese dioxide. A good source of highly porous manganese dioxide is so-called chemically synthesized manganese dioxide or CMD. CMD is usually marketed with a porosity of 25% to 35%. However, CMD can be prepared in the form of very porous spheres having a porosity of approximately 60%. The porous spheres have a substantial amount of surface available for reaction with oxygen in an air-assisted cell. To increase the total energy capacity of an air-assisted cell in an air-free environment, substantially solid $MnO_2$ must be available for the cell reaction. A good source of substantially solid $MnO_2$ is electrolytically deposited $MnO_2$ or EMD. EMD can be obtained in the form of dense particles after the electrolytically deposited material is stripped from the electrodes, crushed and screened. EMD has a porosity of approximately 10%-16% and therefore is a substantially solid material. As the ratio of EMD to CMD increases, the cell's air-free capacity also increases. The amount of CMD and EMD used in the cathode of the cell depends on the desired parameters of the cell with, for example, more or less CMD being used per cathode depending on the energy capacity desired in the presence of air. For a good cell capacity in an air-free environment and good rechargeability in an environment containing air, a mixture of 1:5, that is, one part by weight of CMD to five parts by weight of EMD is preferred.

After the cathode 6 is formed in the container 4 a separator 8 is added to electrically isolate the anode material 10 from the cathode 6 and the container 4 while still permitting ion transport between the electrodes. The anode mix 10 is then added to the separator lined cavity of the cell. The anode mix 10 comprises a mixture of zinc powder, a gel forming binder and a liquid electrolyte used in the cell. The preferred binder is Carbopol 940 which is a carboxy polymethylene polymer available from the B. F. Goodrich Company, of Cleveland, Ohio. The preferred electrolyte is an aqueous solution of potassium hydroxide.

In an air-assisted cell 2, the discharged active cathode 6, that is the manganese dioxide, undergoes a reaction with the air in the cell and with air which can enter the cell, to become recharged thereby reoxidizing the reduced manganese oxide to manganese dioxide. In the discharge of the alkaline cell, the manganese dioxide is reduced to a lower oxidation state. The oxygen in the air will spontaneously restore or regenerate the higher oxidation state over a period of time. If the cell is subjected to brief periods of high rate discharge, then the cell must be rested for substantial periods of time between each discharge to enable the air to completely recharge the $MnO_2$. However, if the cell is continuously discharged at a rate which is less than the rate at which the $MnO2$ is recharged by the incoming air, then the air recharges the $MnO2$ as quickly as it is discharged. In other words, regardless of the rate at which the cell is discharged, if the cell is drained at a low rate or is rested for a sufficient period of time, then the cathode's ability to be recharged is limited only by its access to air. The cathode material is regenerated without involving the zinc anode material. The zinc is oxidized during the discharge but it cannot be regenerated during a rest period. In view of this, less cathode material needs to be added to an air-assisted alkaline cell and, in turn, the volume of zinc can be increased in the cell to increase the overall capacity of the cell.

Returning again to a discussion of FIG. 1, the alkaline electrolyte solution is approximately a 34% to 37% by weight solution of potassium hydroxide in water. The electrolyte from the anode mix 10 permeates the separator 8, and the cathode 6. An open area 12 is left in the cell to provide room for expansion of the anode mix 10.

A subassembly indicated generally by the number 20, referring to FIG. 2, is used to close the cell. The subassembly 20 consists of an anode current collector nail 22, a seal member 24, a multilayer film 26 and a neutral cover 28. The neutral cover 28 is designed to provide space 13 between multilayer film 26 and neutral cover 28 as shown in FIG. 1. The multilayer film will initially expand into space 13 and then continue to expand through opening 48 and into space 68 where it will burst. The anode current collector nail 22 is made from an electrically conducting metal such as brass, which is inert to the cell's caustic environment. The seal member 24 has a substantially flat bottom portion 30 surrounding an upstanding inner wall 32 and is preferably made of polypropylene.

A plurality of circumferentially spaced spokes 34 extend from the periphery of the bottom portion 30 out to and below a peripheral upstanding wall 36 extending upwardly away from bottom portion 30. The spaces 38 between the spokes 34 provide a passage for air to pass through the seal member 24.

A multilayer film 26 fits within the area of the seal member 24 bounded by the peripheral wall 36 and inner wall 32. The multilayer film 26 as shown is made of two layers 40 of polypropylene. The multilayer film 26 is laser welded at peripheral area 42 and inner area 44 producing a sealed multi layer assembly. As stated above, if desired, although not shown, a top layer could be dispensed onto the multilayer film and have spaced apart openings to permit the multilayer film 26 to expand with minimum resistance or restriction. The multi layer film 26 can be fastened to the bottom 30 and the spokes 34 by welding, if desired. If also desired, the multilayer film 26 could be secured together and also to the bottom 30 of seal member 38 at the same time using conventional welding techniques such as ultrasonic welding. A fatty polyamide adhesive, such as the type disclosed in Winger U.S. Pat. No. 3,922,178 can be used to backup the weld and to prevent electrolyte creep between the polypropylene seal 24 and the multilayer film 26. Two beads of the adhesive can be used. One bead is placed around the periphery of the bottom 30 where it joins the inside of peripheral wall 36 and the second bead can be placed on the bottom 30 where it joins the inner upstanding wall 32. To further ensure that the multilayer film 26 stays in position, a pair of concentric raised ridges 46 can be formed on the bottom 30 of the seal 24. The multilayer film 26 will then be clamped between ridges 46 on the bottom 30 and the neutral cover 48. The vented neutral cover 28 is preferably made of stainless steel and has a pair of spaced apertures 48 therein to allow the passage of air into the cell. The vented neutral cover 28 will fit within the area of the seal member 24 bounded by the peripheral wall 36. A conductive nail 22, preferably made of brass and having a thinned portion 23 which can be forceably slid into and through subassembly 20 to maintain the parts together. The dimensions of the several components of the subassembly 20 and of the overall cell can be varied to meet particular size requirements for the type of cell being assembled.

The subassembly 20 is inserted into the bottom of the inverted cell as shown in FIG. 1. The peripheral wall 36 of the seal member 24 insulates the neutral cover 28 from electrical contact with the container 4. To complete assembly of the cell, an external bottom cover 52 is placed into the steel container 4 and is also insulated from contact with the container 4 by the peripheral wall 36 of seal member 24. The bottom cover 52 makes electrical contacts with the nail 22, or other suitable electrically conductive means, enabling the bottom cover 52 to become the second external terminal for cell 2. The edge of the steel container 4, and of the subassembly 20, are then rolled to hold the upturned portion 54 of the bottom cover 52 locked in position on the bottom of the cell 2. A gap 56 surrounds the bottom cover 53, separating it from contact with the container 4. The bottom cover 52 preferably contains three small apertures 58, one of which is shown in FIG. I, spaced approximately 120° apart which provide a passage for air to enter into the bottom of the cell 2. The air can pass through the subassembly 20 and contact the top portion of the cathode 6 through the air passage 38. The top cover 60 can be fastened to the container by welds 62 after the cathode is rammed into place. It can be added before or after this step as it is merely attached to the container 4.

FIG. 3 shows a washer or film strip 64 that can be placed over multilayer film 26 if desired. Film strip 64 has a plurality of openings 66 through which the multilayer film 26 can expand though and burst in space 68 shown in FIG. 1.

As stated above, the multilayer seal of this invention can be used with any cell system, even hermetically sealed cells. One requirement is that a space is provided above at least a portion of the multilayer film so that the film can expand into the space and burst open when the internal pressure of the cell exceeds a predetermined level.

EXAMPLE

Several AA size alkaline cells (Sample A) were produced using the cover and seal assembly as shown in FIG. 1 except that a thin layer of polypropylene having a spoked wheel configuration as shown in FIG. 3 was placed on top of the multilayer film and secured to the multilayer film and the base of the seal member using ultrasonic welding. The multilayer film was composed of two 4 to 5 mils thick layers of polypropylene. Similar type cells (Sample B) were produced except that only a single layer of 4 to 5 mils thick polypropylene was used. Each seal and cover assembly was subjected to a pressure until the multilayer film or single layer film expanded through the opening in the neutral cover and burst into the space defined between the neutral cover and the external cover. The pressure required to expand and burst the single layer film was 400 to 450 psi. The pressure required to expand and burst the multilayer film was 440 to 480 psi. This test clearly showed that the thickness of the multilayer film can be double that of the single layer film while increasing the pressure to burst the multilayer film by no more than 20% over the pressure to burst the single layer film.

Through the invention has been described with respect to preferred embodiments thereof, many variations and modifications will become apparent to those skilled in the art. It is therefore the intention that the appended claims be interpreted as broadly as possible in view of the prior art to include all such variations and modifications.

What is claimed:

1. A galvanic cell comprising the active components of the cell, including an electrolyte, all housed within a container closed by a cover associated with a seal assembly comprising an organic polymeric seal member having a base with at least one opening and a multilayer plastic film disposed onto and secured to said base, said multilayer plastic film and said cover and seal assembly defining a space above said multilayer plastic film and wherein the internal pressure within the cell required to expand and burst the multilayer plastic film into the defined space is no greater than 20% higher than the pressure required to expand and burst a single layer of the same material as, and having one half the thickness of, the multilayer plastic film.

2. The galvanic cell of claim 1 wherein the internal pressure within the cell required to expand and burst the multilayer plastic film into the defined space is no greater than 15% higher than the pressure required to expand and burst a single layer of the same material as, and having one half the thickness of, the multilayer plastic film.

3. The galvanic cell of claim 2 wherein the internal pressure within the cell required to expand and burst the multilayer plastic film into the defined space is no greater than 10% higher than the pressure required to expand and burst a single layer of the same material as, and having one half the thickness of, the multilayer plastic film.

4. The galvanic cell of claim 1 wherein the multilayer plastic film is selected from the groups consisting of polypropylene, polyethylene, polytetrafluoroethylene and nylon.

5. The galvanic cell of claim 4 wherein the multilayer plastic film is polypropylene.

6. The galvanic cell of claim 1 wherein the seal member is polypropylene.

7. The galvanic cell of claim 1 wherein said seal member has a centrally located upstanding wall defining an opening in the base of said member and a peripheral upstanding skirt, said multilayer film has a centrally defined opening to accommodate the centrally located upstanding wall and said multilayer film disposed onto and secured on the base of the seal member between the centrally located upstanding wall and the upstanding peripheral skirt.

8. The galvanic cell of claim 1 wherein a plastic film having at least one opening is disposed on top of the multilayer film.

9. The galvanic cell of claim 1 wherein a neutral cover having at least one opening is disposed on top of the multilayer film.

10. The galvanic cell of claim 1 wherein the neutral cover having at least one opening defines a space between said neutral cover and said multilayer film in which the multilayer film can initially expand into said space from a pressure buildup within the cell.

11. The galvanic cell of claim 10 wherein the defined space between the cover and multilayer film is reduced by the neutral cover and wherein internal pressure will cause the multilayer film to initially expand into the space defined by the multilayer film and neutral cover and then continue to expand the multilayer film into the at least one opening in the neutral cover and burst into the defined space between the cover and neutral cover.

12. The galvanic cell of claim 1 wherein the seal member is polypropylene and the multilayer film is polypropylene.

13. The galvanic cell of claim 12 wherein the multilayer film is composed of two layers.

14. The galvanic cell of claim 1 wherein the base of the seal member has a plurality of spaced apart openings.

15. The galvanic cell of claim 1 wherein at least one layer of the multilayer film is different in thickness than another layer of the multilayer film.

16. The galvanic cell of claim 15 wherein said multilayer film is composed of two layers.

17. The galvanic cell of claim 15 wherein the multilayer film is polypropylene.

18. The galvanic cell of claim 1 wherein the galvanic cell is an alkaline cell.

19. The galvanic cell of claim 1 wherein the galvanic cell is an air-assisted alkaline cell.

20. The galvanic cell of claim 1 wherein the galvanic cell is a metal hydride cell.

* * * * *